April 10, 1962  W. D. ALLISON  3,029,091
VEHICLE SUSPENSION HAVING U-SHAPED TORSION BAR
Filed Nov. 16, 1959  3 Sheets-Sheet 1
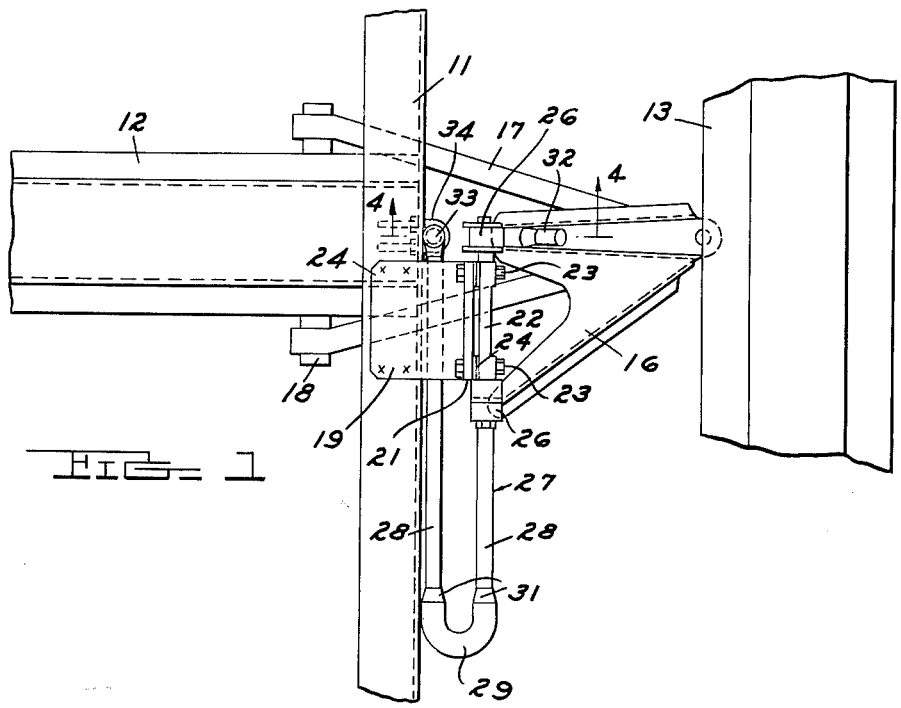
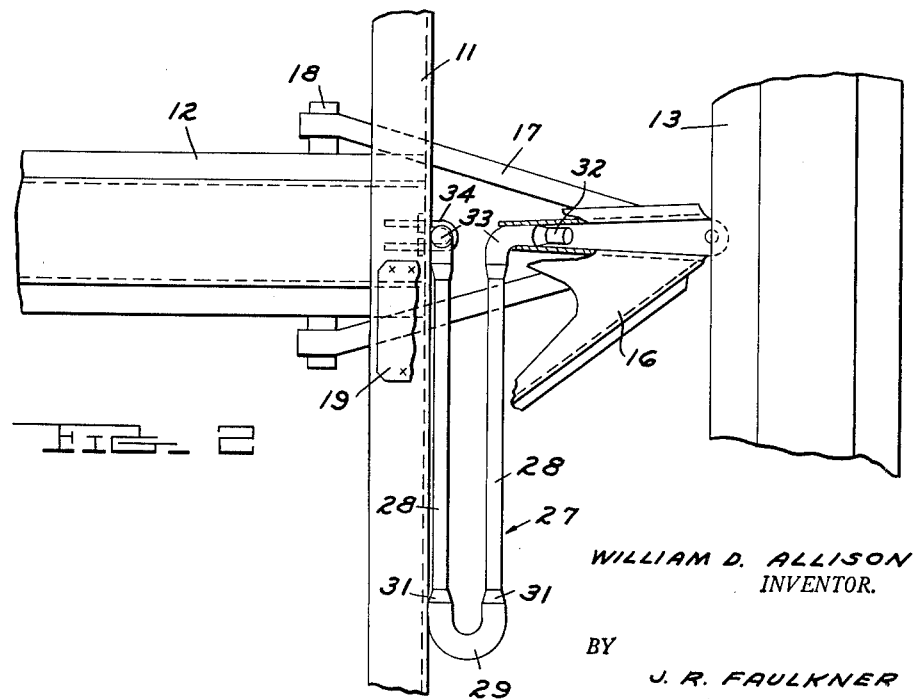
WILLIAM D. ALLISON
INVENTOR.
BY
J. R. FAULKNER
T. H. OSTER
ATTORNEYS April 10, 1962  W. D. ALLISON  3,029,091
VEHICLE SUSPENSION HAVING U-SHAPED TORSION BAR
Filed Nov. 16, 1959  3 Sheets-Sheet 2
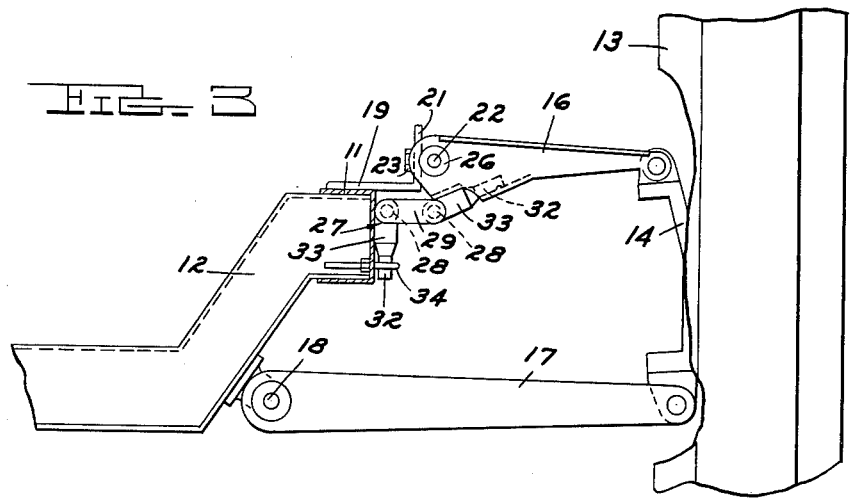
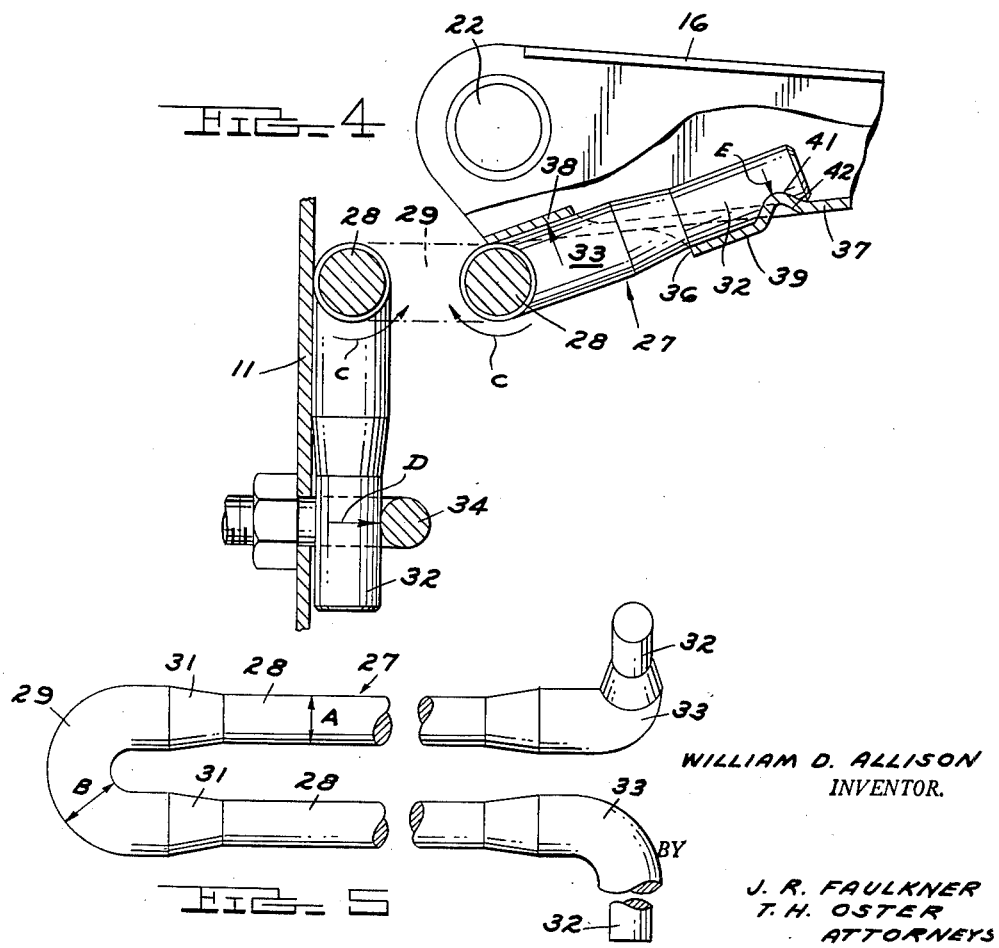
WILLIAM D. ALLISON
INVENTOR.
BY
J. R. FAULKNER
T. H. OSTER
ATTORNEYS

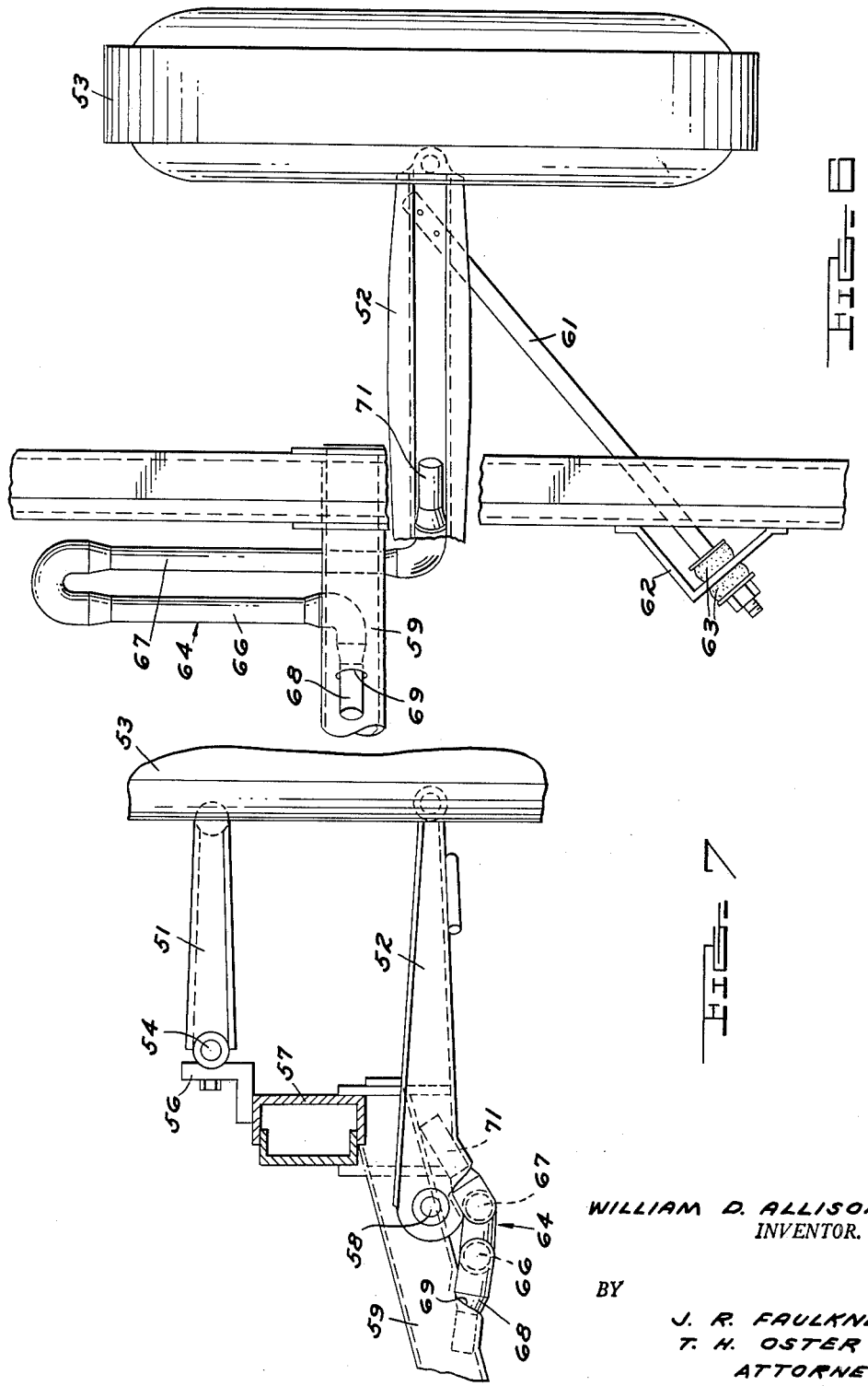

United States Patent Office 3,029,091
Patented Apr. 10, 1962

3,029,091
VEHICLE SUSPENSION HAVING U-SHAPED TORSION BAR
William D. Allison, Grosse Pointe Farms, Mich., assignor to Ford Motor Company, Dearborn, Mich., a corporation of Delaware
Filed Nov. 16, 1959, Ser. No. 853,140
3 Claims. (Cl. 280—124)

This invention relates generally to motor vehicle suspension and particularly to suspensions utilizing torsion bars.

An object of the invention is to provide a vehicle suspension utilizing a torsion bar in which a bar having a sufficiently long effective length to achieve the desired ride characteristics can be employed, yet in which the torsion bar can be installed in a relatively short linear space. Another object of the invention is to provide a suspension of this type in which the torsion bar can be installed closely adjacent a vehicle frame member and a wheel suspension arm so that it may be compactly arranged in such a position as to cause a minimum of interference with other vehicle components and to permit flexibility of vehicle design without departing from conventional arrangements.

A still further object of the invention is to provide a vehicle suspension utilizing a torsion bar of generally U-shape in which one leg portion of the bar is anchored to the vehicle frame and the other leg portion of the bar extends closely adjacent the pivot axis of a wheel suspension arm and is anchored to the arm. The invention also contemplates minimizing torsional stress in the vehicle frame structure by anchoring the torsion bar to the vehicle frame adjacent the frame cross member supporting one of the suspension arms.

Still another object of the invention is to provide a torsion bar suspension for a motor vehicle utilizing a one piece generally U-shaped torsion bar having a 180° bend intermediate the ends of the bar and in which the diameter of the bar adjacent the bend is materially larger than the diameter of the body of the bar to provide adequate strength for high stress concentrations in this area during vehicle operation, while at the same time permitting the body portions of the bar to be of the proper diameter for the most effective suspension characteristics.

Other objects and advantages of this invention will be made more apparent as this description proceeds, particularly when considered in connection with the accompanying drawings, in which:

FIGURE 1 is a fragmentary plan view of a portion of a motor vehicle incorporating the wheel suspension of the present invention.

FIGURE 2 is a plan view similar to FIGURE 1 but with parts thereof broken away to more fully illustrate the torsion bar thereof.

FIGURE 3 is an end elevation of the structure shown in FIGURES 1 and 2.

FIGURE 4 is an enlarged, cross sectional view taken on the line 4—4 of FIGURE 1.

FIGURE 5 is an enlarged elevational view, partly broken away, of the torsion bar utilized in FIGURES 1 to 4 inclusive.

FIGURE 6 is a fragmentary plan view of a modified suspension.

FIGURE 7 is an end elevation of the construction shown in FIGURE 6.

Referring to the drawings, and particularly to the form of the invention shown in FIGURES 1 to 5 inclusive, the reference character 11 indicates a channel shaped longitudinal side frame rail of a motor vehicle chassis. The frame rail 11 is connected to a similar frame rail at the opposite side of the vehicle by a transversely extending cross frame member 12 of hat-shaped section.

Inasmuch as both sides of the vehicle are identical in construction, the drawings illustrate the suspension for one front road wheel 13 only. The road wheel 13 is conventionally mounted upon a spindle support 14 and pivotally connected at its upper and lower extremities to the outer ends of upper and lower suspension arms 16 and 17. In the present instance these arms are of conventional wishbone shape, with the lower arm 17 being longer than the upper arm 16.

The inner end of the lower arm 17 is pivotally supported at 18 upon the cross frame member 12 while the upper suspension arm 16 is pivotally supported upon a frame bracket 19 welded to the longitudinal side frame rail 11. An integral vertical flange 21 is provided at the outer end of the frame bracket 19 and supports a pivot shaft 22 which is secured thereto by means of bolts 23 and shims 24. The ends of the pivot shaft 22 extend beyond the frame bracket 19 and carry rubber bushings 26 pivotally supporting the inner bifurcated end of the upper suspension arm 16.

The construction thus far described is conventional, and it will be understood that other types of wheel suspension structures may be utilized in conjunction with the torsion bar of the present invention.

The torsion bar 27 is generally U-shaped and comprises two elongated generally parallel leg portions 28 of circular cross section and of generally uniform diameter. The two leg portions 28 are interconnected at one end of the bar by an integral U-shaped intermediate portion 29. The intermediate portion 29 of the bar is of circular cross section and has a diameter B substantially larger than the diameter A of the leg portions 28 of the bar FIGURE 5. The change in diameter from the small diameter A of the leg portions of the bar to the larger diameter B of the intermediate portion of the bar is smoothly effected by means of tapered interconnecting portion 31.

The opposite or free ends of the U-shaped torsion bar 27 are so formed as to permit them to be anchored to the vehicle frame and to the suspension arm respectively. Various constructions may be used for the anchored ends, that shown here comprising bent terminal end portions 32 extending generally at right angles to the leg portions 28 of the bar and joined to the leg portions by interconnecting portions 33 of greater diameter.

The torsion bar 27 is positioned closely adjacent the side frame rail 11 and extends generally longitudinally of the vehicle. One leg portion 28 of the bar lies immediately adjacent the vertical side wall of the frame rail 11 and its terminal end portion 33 is anchored to the frame rail by means of a U-bolt 34 embracing the bar end and secured to the frame rail. To minimize the torsional stress in the vehicle structure, the terminal end 32 of this leg portion of the bar is anchored by the U-bolt 34 to the side frame rail immediately adjacent its interconnection to the cross frame member 12 which carries the lower suspension arm 17.

The second leg portion 28 of the torsion bar is spaced laterally outwardly from the side frame rail 11 and extends parallel to the pivot bolt 22 for the upper suspension arm 16 and is closely adjacent thereto. This leg portion of the bar extends substantially the entire length of the pivot bolt 22 and its right angle bent terminal end 32 is located adjacent the forward end of the pivot bolt 22. The end 32 projects through an opening 36 in the lower wall 37 of the sheet metal suspension arm. This opening 36 is so formed as to provide a wall 38 engaging the enlarged interconnecting portion 33 of the bar and a wall 39 engaging the reduced terminal end portion 32 of the bar. A notch 41 is formed in the end of the bar and engages a ledge 42 in the lower wall of the suspension arm to locate the bar and to prevent displacement with respect to the suspension arm.

It will be noted that the torsion bar 27 is generally symmetrical about a longitudinal axis except that the two terminal end portions 32 may extend at different angles with respect to the leg portions 28 of the bar, dependent upon the geometry of the vehicle suspension and the wind-up angle necessary between the free position of the bar and its restrained operative position. The operative normal load position is shown in FIGURE 4, and the arrows C indicate the torsional loading of the leg portions 28 of the bar. Arrow D indicates the reaction of the frame anchored terminal end 32 of the bar against the U-bolt 34, while the arrow E indicates the reaction of the suspension arm anchored terminal end 32 of the bar against the lower wall 37 of the suspension arm.

This torsion bar installation is compactly arranged adjacent the side frame rail of the vehicle and occupies a minimum of space, thus permitting flexibility of vehicle design without interference with other vehicle components. The U-shaped bar requires only a short linear space yet provides a bar having sufficient length for the desired operating characteristics. Further flexibility is obtained since the leg portions of the bar may, if desired, be of unequal length, and may be anchored at convenient points to the frame and the suspension arm. The elongated leg portions 28 of the bar may be designed with an optimum diameter A for load carrying and riding characteristics, yet the strength needed for the highly stressed U-shaped intermediate portion 29 of the bar is economically and effectively obtained by providing this portion of the bar with a substantially greater diameter B, with the transition between the two portions of the bar being smoothly effected by means of the tapered interconnecting portions 31. Long life is thus obtained without impairing the operation of the bar.

Referring now to the modification of the invention shown in FIGURES 6 and 7, it will be seen that a somewhat different type of independent front wheel suspension is utilized employing upper and lower suspension arms 51 and 52 respectively. The suspension arms conventionally support a road wheel 53 at their outer ends. The upper arm 51 may be of wishbone shape and is pivotally connected at 54 to a frame bracket 56 welded to the longitudinal side frame rail 57. The lower suspension arm 52 is in the form of a laterally extending strut of hat-shaped cross section, pivotally connected at 58 to a frame cross member 59. Lateral stability for the lower suspension arm 52 is obtained by a track bar 61 secured to the outer end of the suspension arm and extending diagonally forwardly of the vehicle and pivotally connected to a frame bracket 62 by means of rubber pucks 63.

A U-shaped torsion bar 64 is employed and is generally similar to the U-shaped torsion bar shown in FIGURES 1 to 5 inclusive, except that the leg portions 66 and 67 are of different length. In addition, the bar is connected to the lower suspension arm rather than to the upper suspension arm.

The leg 66 of the bar has a right angle terminal end 68 anchored to the frame cross member 59 by extending the end through a formed opening 69 in the lower wall of the cross member. The terminal end 71 of the longer leg portion 67 of the bar is similarly anchored to the lower suspension arm 52 and it will be noted that the leg portion 67 extends generally parallel to the pivot axis 58 of the lower suspension arm and closely adjacent thereto.

The torsion bar of the present invention may be similarly adapted to other types of vehicle suspensions and it will be understood that the invention is not to be limited to the exact construction shown and described, but that various changes and modifications may be made without departing from the spirit and scope of the invention as defined in the appended claims.

I claim:
1. In a spring suspension for a vehicle having a frame and a road wheel, a suspension arm for said road wheel pivotally supported upon said frame for swinging movement about a pivot member, a generally U-shaped torsion bar having a pair of adjacent leg portions extending generally longitudinally of said vehicle one of said leg portions extending adjacent said frame and anchored thereto and the other extending generally parallel to and in overlapping relationship with the pivot member for said suspension arm, said other leg portion having an end portion anchored to said suspension arm, said suspension arm being of sheet metal construction and having a groove formed therein, said groove extending perpendicular to the axis of said pivot member and having an inwardly facing opening beneath said axis, said end portion extending laterally outwardly through said opening and seated in said groove.

2. In a spring suspension for a vehicle having a frame provided with a longitudinally extending frame member and a road wheel adjacent thereto, a suspension arm for said road wheel, a pivot shaft pivotally connecting said suspension arm to said frame member for pivotal movement about an axis generally parallel to said frame member, a U-shaped torsion bar having one leg portion positioned adjacent said frame member and having its terminal end portion anchored to said frame member, said torsion bar having a second leg portion extending generally parallel to said first leg portion and integrally connected thereto by an intermediate return bent portion, said second leg portion extending generally parallel to said pivot shaft for substantially the entire length thereof and having its terminal end portion anchored to said suspension arm adjacent the end of said pivot shaft farthest from said bent portion, said suspension arm having a laterally extending groove and said end portion having a laterally extending part nested in said groove.

3. In a suspension system for a vehicle having a longitudinally extending frame member and a road wheel connected thereto by a pivotally mounted suspension arm; a U-shaped torsion bar having parallel leg portions, a major bend, and terminal end portions bent at right angles to said leg portions; said frame member having a longitudinally extending flat vertical surface; one of said end portions being secured to said surface and the leg portion connected thereto extending parallel and closely adjacent to said surface; a pivot shaft pivotally supporting said suspension arm; said suspension arm having a groove extending generally perpendicular to said pivot shaft; said groove being situated in said arm adjacent the end of said pivot shaft farthest from the major bend of said U-shaped torsion arm; and the other end portion of said torsion bar being secured in said groove.

References Cited in the file of this patent
UNITED STATES PATENTS

| | | |
|---|---|---|
| 487,202 | Timken | Nov. 29, 1892 |
| 2,794,632 | Schilberg | June 4, 1957 |
| 2,858,142 | Schjolin | Oct. 28, 1958 |